United States Patent
Entschel et al.

[15] 3,674,772
[45] July 4, 1972

[54] BASIC PHENYLAZOPHENYL DYES CONTAINING A QUATERNIZED AMINOALKYLENECARBOXAMIDE

[72] Inventors: Roland Entschel; Willy Steinemann, both of Basel, Switzerland

[73] Assignee: Sandoz Ltd. (a/k/a Sandoz A.G.), Basle, Switzerland

[22] Filed: July 8, 1968

[21] Appl. No.: 743,037

[30] Foreign Application Priority Data

July 25, 1967 Switzerland .................10548/67
Aug. 29, 1967 Switzerland .................12125/67

[52] U.S. Cl. ..................260/207, 260/152, 260/154, 260/155, 260/156, 260/157, 260/206
[51] Int. Cl. ..............C09b 29/26, C09b 43/12, D06p 3/26
[58] Field of Search ....................260/207, 156, 152, 154

[56] References Cited

UNITED STATES PATENTS

| | | | |
|---|---|---|---|
| 1,887,289 | 11/1932 | Conzetti | 260/156 |
| 1,887,995 | 11/1932 | Conzetti | 260/156 |
| 2,219,280 | 10/1940 | Graenecker et al. | 260/156 |
| 2,436,115 | 2/1948 | McNally et al. | 260/156 |
| 3,117,960 | 1/1964 | Illy | 260/156 X |
| 3,119,810 | 1/1964 | Sartori | 260/156 X |
| 3,148,181 | 9/1964 | Wallace et al. | 260/207 |

FOREIGN PATENTS OR APPLICATIONS 8,084 12/1962 Japan....................260/156

Primary Examiner—Floyd D. Higel
Attorney—Irwin Morton Aisenberg

[57] ABSTRACT

Basic monoazo dyes of the formula

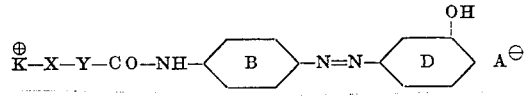

wherein X stands for an alkylene radical,
Y for the direct linkage or an arylene radical,
K for an ammonium or a hydrazinium group
and A for an anion and wherein the aromatic ring
B contains at least one substituent and the aromatic ring D may bear further substituents, are useful for dyeing polyacrylonitrile and acrylonitrile copolymer fibers. Very level and pH-stable dyeings with very good light and wet fastness are thus obtained.

11 Claims, No Drawings

BASIC PHENYLAZOPHENYL DYES CONTAINING A QUATERNIZED AMINOALKYLENECARBOXAMIDE

This invention relates to basic dyes of formula

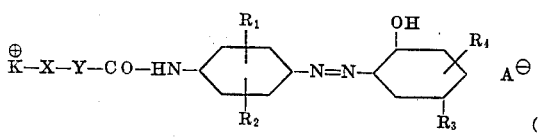

where X stands for a lower, straight or branched alkylene radical which may be substituted; Y, for the direct linkage or an arylene radical which may be substituted; $R_1$, for lower alkyl or alkoxy which may be substituted, a halogen atom, or a nitro, cyano, alkylsulphonyl, arylsulphonyl, trifluoromethyl or sulphonic acid amide group; $R_2$, for hydrogen, lower alkyl or alkoxy which may be substituted or a halogen atom; $R_3$, for a hydrogen or halogen atom, an alkyl or alkoxy group which has one to six carbon atoms and may be substituted, the cyano group, an alkylsulphonyl or arylsulphonyl group which may be substituted, an acylated amino group, a disubstituted sulphonic acid amide group, an oxazoline radical or the radical of 1-aza-2-ketocyclopentane, 1-aza-2-keto-oxacyclopentane or 1-aza-2-keto-oxacyclohexane; $R_4$, for a hydrogen or halogen atom or an alkyl group which has one to six carbon atoms and may be substituted; $A^\ominus$, for an anion equivalent to the dye cation, and $K^\oplus$ for a group of formula

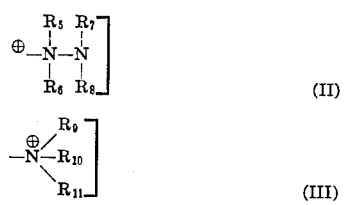

In formulas (II) and (III) $R_5$ stands for an alkyl or cycloalkyl radical which may be substituted or together with $R_6$ and the $N^\oplus$— atom for a heterocycle; $R_6$, for an alkyl or cycloalkyl radical which may be substituted or together with $R_5$ and the $N^\oplus$—atom for a heterocycle; $R_7$ and $R_8$, for hydrogen or identical or different alkyl or cycloalkyl radicals which may be substituted; $R_9$, $R_{10}$ and $R_{11}$ each stands for an alkyl or cycloalkyl radical which may be substituted; and where $R_5$ together with $R_7$ and/or $R_6$ together with $R_8$ and the N atoms adjacent to these substituents, and $R_9$ and $R_{10}$ or $R_9$, $R_{10}$ and $R_{11}$ together with the $N^\oplus$ atom, may form heterocycles.

The dyes of formula (I) can be produced by reacting a compound of formula

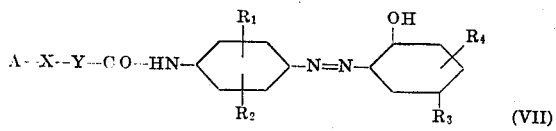

where A represents the acid radical of an ester, with the compound of formula

or

Dyes of formula (I) in which $R_3$ has a meaning other than hydrogen can be obtained by coupling the diazo component of an amine of formula

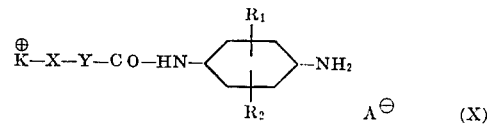

with a compound of formula

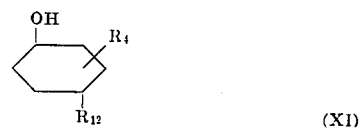

where $R_{12}$ represents a halogen atom or a substituted or unsubstituted alkyl or alkoxy group having one to six carbon atoms, the cyano group, a substituted or unsubstituted alkylsulphonyl or arylsulphonyl group, an acylated amino group, a disubstituted, e.g. dialkylated, sulphonic acid amide group, an oxazoline radical, or the radical of 1-aza-2-ketocyclopentane, 1-aza-2-ketooxacylcopentane or 1-aza-2-keto-3-oxacyclohexane.

Dyes of formula (I) in which $R_9$ and $R_{10}$ each stands for a substituted or unsubstituted alkyl or cycloalkyl radical, or together with the adjacent N atom form a saturated or partially saturated heterocycle, e.g. a piperidine, piperazine, pyrrolidine, morpholine or aziridine ring, can be obtained by converting a compound of formula

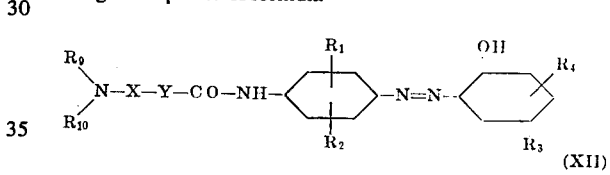

with a quaternating agent $R_{11}$-A (a) into a compound of formula

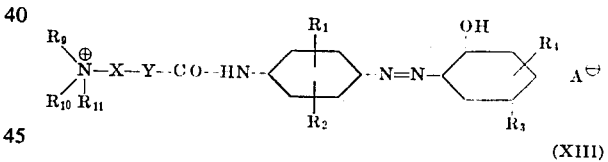

The dyes of formula (I) can also be produced by condensing a carboxylic acid or a functional derivative of a carboxylic acid of formula

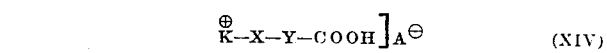

with an aminoazo dye of formula

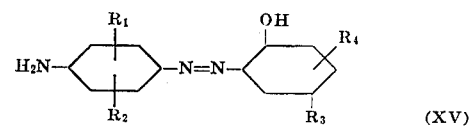

Particularly good dyes correspond to formula

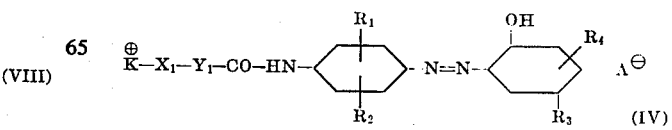

where $X_1$ represents one of the radicals —$CH_2$—, —$C_2H_4$—, —$C_3H_6$—,

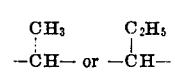

$Y_1$, represents the direct linkage, and $R_1$, $R_2$, $R_3$, $R_4$, $A^{\ominus}$ and $K^{\oplus}$ have the previously stated meanings. Similarly good dyes correspond to formula

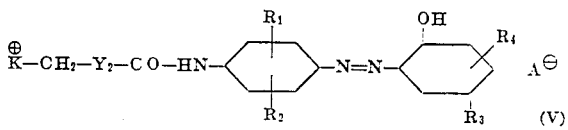

where $Y_2$ represents an arylene radical, preferably a phenylene radical, which may be substituted and $R_1$, $R_2$, $R_3$, $R_4$, $A^{\ominus}$ and $K^{\oplus}$ have the meanings given them in the foregoing. Equally good dyes correspond to formula

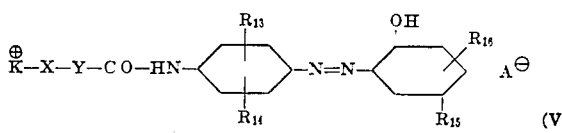

where $R_{13}$ represents methyl, ethyl, methoxy, ethoxy, trifluoromethyl, nitro, chlorine or bromine; $R_{14}$, hydrogen, methyl, ethyl, methoxy or ethoxy; $R_{15}$, hydrogen, halogen or an alkyl or alkoxy radical having one to six carbon atoms; and $R_{16}$, hydrogen. In the dyes of formula (I) the anion $A^{\ominus}$ may be exchanged for another anion, e.g. with the aid of an ion exchanger. In each instance "halogen" refers preferably to chlorine or bromine.

The low molecular, substituted or unsubstituted alkyl or alkoxy radicals generally contain one to six or preferably one to four or one to three carbon atoms. If these radicals are substituted, in particular the alkyl radicals, they contain for example a hydroxyl group, a halogen atom, the cyano group or an aryl radical. Substituted alkyl can stand for an aralkyl radical, such as the benzyl radical. Examples of alkylsulphonyl and arylsulphonyl radicals are methylsulphonyl, ethylsulphonyl and phenylsulphonyl. The monoalkyl- or preferably dialkylsulphonic acid amide group is an example of a sulphonic acid amide group. The alkyl radical is preferably a lower alkyl radical.

When neither $R_7$ nor $R_8$ stands for a hydrogen atom, the radicals $R_5$ to $R_8$ represent unsubstituted or substituted alkyl radicals, such as methyl, ethyl, propyl or butyl radicals, or cycloalkyl radicals such as cyclohexyl radicals. If these radicals are substituted, they contain in particular a hydroxyl group, a halogen atom, the cyano or a phenyl group. Substituted alkyl can stand for an aralkyl, e.g. benzyl, radical.

The radicals $R_5$ and $R_6$ together with the adjacent $N^{\oplus}$ atom may form a heterocycle, e.g. a pyrrolidine, piperazine, morpholine, aziridine or piperidine ring.

The radical $R_5$ together with $R_7$ and/or the radical $R_6$ together with $R_8$ and the N atoms adjacent to these substituents may form a saturated or unsaturated, preferably five- or six-membered heterocycle, e.g. a pyrazolidine, pyridazine or pyrazoline ring, such as trimethylene-pyrazolidine or tetramethylene-pyrazolidine. The radicals $R_9$ to $R_{11}$ represent substituted or unsubstituted alkyl radicals, e.g. methyl, ethyl, propyl or butyl radicals, or cycloalkyl radicals, such as cyclohexyl radicals. If these radicals are substituted they contain in particular a hydroxyl group, a halogen atom, the cyano or a phenyl group. Substituted alkyl can stand for an aralkyl radical, e.g. a benzyl radical.

The radicals $R_9$ and $R_{10}$ together with the adjacent $N^{\oplus}$ atom may form a heterocycle, e.g. a pyrrolidine, piperidine, morpholine, aziridine or piperazine ring. The radicals $R_9$ to $R_{11}$ together with the adjacent $N^{\oplus}$ atom may form a heterocycle, e.g. a group of formula

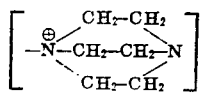

or a pyridine ring.

When X represents an alkylene radical, it is desirable for Y to stand for the direct linkage, though Y may alternatively be a substituted or unsubstituted arylene radical, such as a phenylene, naphthylene or tetrahydronaphthylene radical.

The alkylene radical X may contain one to six or preferably one to three carbon atoms; it may be straight or branched and substituted, for example by hydroxyl.

The preferred acid radicals A are those of hydrohalic acids; A stands for Cl or Br. Examples of further acid radicals A are those of sulphuric acid, a sulphonic acid or of hydrogen sulphide.

The anion $A^{\ominus}$ may be an organic or inorganic ion, e.g. a halogen ion such as chlorine, bromine or iodine, or the ion of methyl-sulphate, sulphate, disulphate, perchlorate, phosphate, phosphotungstic molybdate, benzene sulphonate, naphthalene sulphonate, 4-chlorobenzene sulphonate, oxalate, maleinate, acetate, propionate, methanesulphonate, chloroacetate or benzoate, or a complex anion, such as that of zinc chloride double salts. The reaction of a compound of formula (VII) with a compound of formula (XIII) or (IX) is effected preferably in an organic solvent at temperatures of $-50°$ to $+250°C$, most advantageously at $-10°$ to $+120°C$.

The reaction can be conducted in an aqueous medium with the addition of an organic solvent or in the absence of organic solvent at the aforestated temperatures.

The reaction of a compound of formula (XII) with a quaternating agent to form a compound of formula (XIII) is carried out preferably in an inert solvent, in aqueous suspension or without solvent in an excess of the quaternating agent $R_{11}$-A, and at elevated temperatures and, if required, in a buffered medium. Examples of quaternating agents are alkyl halides, e.g. methyl or ethyl chloride, bromide or iodide, alkyl-sulphates, such as dimethyl sulphate, acrylic acid amide/hydrochloride, e.g. $CH_2=CH-CO-NH_2/HCl$.

The coupling of diazotized compounds of formula (X) with compounds of formula (XI) generally takes place in alkali medium with cooling, for example at $0°-5°C$, but it can also be carried out in acetic acid medium.

The new dyes are used for dyeing and printing polyacrylonitrile and acrylonitrile copolymer fibers and textiles made therefrom. They are also employed for dyeing leather and paper.

The dyes of this invention are applicable from weakly alkaline, neutral or weakly acid baths in so far as they are present as salts of strong inorganic or organic acids which form approximately neutral aqueous solutions. It is of advantage to dye from an acid bath, either by preparing the bath with an acid, for example acetic, formic, tartaric, naphthalene sulphonic, sulphuric or phosphoric acid, or alkali bisulphate or acid alkali phosphates, or by adding a substance which produces acid during dyeing, for example the salts of volatile bases with strong non-volatile acids, such as ammonium sulphate, or water soluble esters of organic acids which are saponified in dyeing, for example the methyl or ethyl esters of aliphatic oxy acids, such as lactic, malic or tartaric acid. If mineral acid solutions of the dyes are employed for dyeing, which is the case with betain-like compounds, the mineral acid can be adjusted during the dyeing process by the gradual addition of an alkaline salt of a weaker acid, such as sodium acetate. Dyeing is carried out at temperatures approaching the boil in open baths or at temperatures above 100°C under pressure in enclosed machines. Given the stated dyeing conditions, the baths are exhausted in normal times and very level dyeings are obtained which are mostly of very bright shade, have very good light and wet fastness and are pH-stable. In Japanese "Auslegeschrift" No. 8084/62 the dye of formula

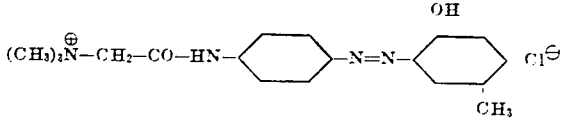

is described, which among other purposes is used for dyeing polyacrylonitrile fibers. The dyes of formula (I) give dyeings of significantly greater depth than this dye on polyacrylonitrile fibers.

In the following Examples the parts and percentages are by weight and the temperatures in degrees centigrade.

EXAMPLE 1

26.2 Parts of 4-amino-2'-chloro-2'-hydroxy-5'-methyl-1,1'-azobenzene are dissolved in 500 parts of toluene at 100°. The solution is cooled to 80° and at this temperature a solution of 12 parts of chloracetyl chloride in 60 parts of toluene is dropped in at a uniform rate over 1 hour. The reaction temperature is then increased to 107° and stirring continued for a further 2 hours at this temperature, after which the temperature is allowed to fall to 80°. In the course of 30 minutes a solution of 7.2 parts of N,N-dimethyl hydrazine in 60 parts of toluene is added. The reaction is allowed to proceed for 1 hour at 80°, then the temperature is raised to 90° and stirring continued for 4 hours. Finally the reaction mixture is allowed to cool to room temperature and the precipitated yellow dye filtered off. The dye can be obtained in the pure form by recrystallization from acetic acid; it is water soluble and gives very fast dyeings of good depth on polyacrylonitrile fibers.

EXAMPLE 2

29.2 Parts of 4-amino-2-chloro-5-methoxy-2'-hydroxy-5'-methyl-1,1'-azobenzene are dissolved in 450 parts of chlorobenzene at 110°. At the same temperature a solution of 21 parts of 3-chloromethyl-4-methyl-benzoyl chloride in 70 parts of chlorobenzene is added dropwise in the course of 1 hour. The reaction temperature is increased to 130°, the solution stirred for 3 hours and then cooled to 75°, at which temperature the solution of 6.6 parts of N,N-dimethylhydrazine in 30 parts of chlorobenzene is added over 30 minutes. Finally the temperature is again raised to 95° and stirring continued for 4 hours at this temperature. On cooling to 30° the water soluble dye settles out. It is filtered off and if necessary purified by recrystallization from acetic acid. It dyes polyacrylonitrile fibers in yellow shades of excellent fastness.

The 21 parts of 3-chloromethyl-4-methylbenzoyl chloride used in this Example can be replaced by 19.5 parts of 4-chloromethylbenzoyl chloride and the reaction conducted on the same lines, upon which a yellow dye is obtained which has the same excellent fastness properties and tinctorial strength on acrylonitrile fibers.

EXAMPLE 3

N,N-dimethylhydrazinium-N-acetic acid-N'-(4'-amino-3'-chloro-6'-methylphenyl)-amide is prepared by reacting 1-chloroacetylamino-2-methyl-4-nitro-5-chlorobenzene with N,N-dimethylhydrazine in water or an inert organic solvent, e.g. toluene, at 75° – 95° and then reducing the nitro group. 30.9 Parts of this amide are dissolved in a mixture of 80 parts of water and 25 parts of 30 percent hydrochloric acid and diazotized with 6.9 parts of sodium nitrite at 0° – 2°. An ice cold solution of 12 parts of 1-hydroxy-4-methylbenzene in 150 parts of water is added to the diazo solution and coupling carried out at a pH value of 7.0 – 8.5 adjusted with sodium bicarbonate. Subsequently the temperature is raised to 35° and the pH adjusted to 3.0 with hydrochloric acid. The dye settles out and is filtered off and recrystallized from acetic acid if necessary. On polyacrylonitrile fibers it gives yellow dyeings of good depth and excellent fastness.

EXAMPLE 4

36 Parts of 2-hydroxy-2'-chloro-4'-(ω-dimethylamino)-acetylamino-5-methyl-5'-methoxy-1,1'-azobenzene, prepared by reacting 2-hydroxy-2'-chloro-4'-chloracetylamino-5-methyl-5'-methoxy-1,1'-azobenzene with dimethylamine, e.g. in toluene at 60°, are dissolved in 750 parts of chlorobenzene at 120°. At this temperature a solution of 25 parts of dimethyl sulphate and 50 parts of chlorobenzene is added over 20 minutes and the reaction mixture is then boiled for one hour with reflux. On cooling to 40° the precipitated water soluble dye is collected on a filter. It can be converted into the chloride by precipitation from aqueous solution, e.g. with sodium chloride. The dye gives fast, bright level dyeings of good depth on polyacrylonitrile fibers.

EXAMPLE 5

27.1 Parts of 4-amino-2'-hydroxy-2,5'-dimethyl-5-methoxy-1,1'-azobenzene are dissolved in 350 parts of nitrobenzene at 80°. In the course of 1 hour 12.5 parts of distilled chloroacetyl chloride are added dropwise at the same temperature with stirring, and afterwards stirring is continued at 85° until no further aminoazo compound is indicated. Then 11 parts of distilled pyridine are added to the dye solution at 85° in the course of 20 minutes and the reaction temperature is raised to 110° over 1 hour. After 2 hours at 110° quaternation is complete. The solution is allowed to cool to 40° and the precipitated dye collected on a filter. After purfication by recrystallation, drying and grinding, the dye is obtained as an orange powder which dissolves in water with a yellow color and gives very fast yellow dyeings on polyacrylonitrile fibers.

EXAMPLE 6

26.1 Parts of 4-amino-2'-hydroxy-2-chloro-5'-methyl-1,1'-azobenzene are dissolved in 150 parts of dioxan at 80°, and at this temperature a solution of 12 parts of chloroacetyl chloride in 20 parts of dioxan is added dropwise at an even rate over 30 minutes. Stirring is continued at 80° until no further diazotizable compound is indicated, on which 17 parts of quinoline are added at an even rate over 30 minutes at 80°. The reaction temperature is raised to 95°, the reaction solution stirred for 5 hours at this temperature and then cooled to 35°. The precipitated compound is filtered off, purified by recrystallization, dried and ground. The new dye is a water soluble orange powder which dyes polyacrylonitrile fibers in very fast yellow shades.

EXAMPLE 7

22.5 Parts of 4-amino-2'-hydroxy-2,5,5'-trimethyl-1,1'-azobenzene are dissolved in 500 parts of toluene. 22 Parts of pyridiniumchloride-N-acetic acid chloride, prepared by reacting pyridinium chloride-N-acetic acid and thionyl chloride, are added and the solution is held at about 100° until no further acylated amino dye is indicated. On cooling to 40° the dye is filtered off, freed from adsorbed toluene in vacuum and recrystallized from dilute acetic acid. On polyacrylonitrile fibers it gives yellow dyeings of excellent light and wet fastness. When the 22 parts of pyridinium chloride-N-acetic acid chloride are replaced by the equivalent amount of α-picolinium chloride-N-acetic acid chloride or quinolinium chloride-N-acetic acid chloride, dyes with similar properties are obtained.

Dyeing Example

A mixture of 20 parts of the dye of Example 1 and 80 parts of dextrin is ground in a ball mill for 48 hours. One part of the resulting preparation is pasted with 1 part of 40 percent acetic acid solution, 400 parts of distilled water are run onto the paste with stirring and the whole is boiled for a short time. The solution is diluted with 7,000 parts of distilled water and finally 2 parts of acetic acid are added. 100 Parts of polyacrylonitrile fabric are entered into this bath at 60°, following treatment for 10 – 15 minutes at 60° in a bath of 8,000 parts of water and 2 parts of glacial acetic acid. The dyebath is raised to 100° in 20 minutes and held at the boil for 1 hour. On rinsing and drying a level yellow dyeing of good depth and with good light and wet fastness is obtained.

In the following Table 1 the structural composition of further dyes is shown, such as can be produced by the procedures of Examples 1 – 7. The symbols $K^{\oplus}$, W and $X_1$ to $X_7$ in the formula

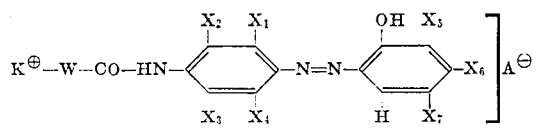

have the meaning given them in the Table. The anion $A^{\ominus}$ may be any one of those named in the specification. The symbol $K^{\oplus}$ may stand for any one of the radicals $K_1 - K_{23}$ listed in Table A. In any of the dyes these groupings can be exchanged for any other of the stated groupings.

In Table A $K^{\oplus}$ may represent any one of the symbols $K_1 - K_{23}$ which represent the groupings:

TABLE A

| | | |
|---|---|---|
| $K_1$ | Represents | $-N(CH_3)_3]$ |
| $K_2$ | do | $-N(C_2H_5)_3]$ |
| $K_3$ | do | $-N(C_2H_5)_2$ with $CH_3$ |
| $K_4$ | do | $-N(C_2H_4OH)_3]$ |
| $K_5$ | do | $-N(C_2H_4OH)_2$ with $CH_3$ |
| $K_6$ | do | piperazinium ring |
| $K_7$ | do | pyridinium |
| $K_8$ | do | $N$-methyl piperidinium |
| $K_9$ | do | $N$-methyl piperidinium |
| $K_{10}$ | do | $N$-methyl morpholinium |
| $K_{11}$ | do | $-N(CH_3)_2$ with $C_2H_4OH$ |

TABLE A — Continued

| | | |
|---|---|---|
| $K_{12}$ | do | $-N(C_2H_5)(C_2H_4OH)$ with $CH_3$ |
| $K_{13}$ | do | $-N(CH_3)_2$ with $C_2H_5$ |
| $K_{14}$ | do | $N$-methyl piperidine |
| $K_{15}$ | do | isoquinolinium |
| $K_{16}$ | do | $-N(CH_3)_2$ with $NH_2$ |
| $K_{17}$ | do | $-N(C_2H_5)_2$ with $NH_2$ |
| $K_{18}$ | do | $-N(C_2H_4OH)_2$ with $NH_2$ |
| $K_{19}$ | do | piperazinyl with $NH_2$ |
| $K_{20}$ | do | piperidyl with $NH_2$ |
| $K_{21}$ | do | morpholinyl with $NH_2$ |
| $K_{22}$ | do | $-N(C_2H_4CN)_2$ with $NH_2$ |
| $K_{23}$ | do | bicyclic $-N-N-$ ring |

TABLE 1

| Ex. No. | W | $K^{\oplus}$ | $X_1$ | $X_2$ | $X_3$ | $X_4$ | $X_5$ | $X_6$ | $X_7$ | Shade of dyeing on polyacrylonitril fibre |
|---|---|---|---|---|---|---|---|---|---|---|
| 8 | $-CH_2-$ | $K_7$ | $CH_3$ | H | H | H | H | H | $CH_3$ | Yellow. |
| 9 | $-CH_2-$ | $K_7$ | Cl | H | H | H | H | H | $CH_3$ | Do. |
| 10 | $-CH_2-$ | $K_7$ | H | $OCH_3$ | H | H | $CH_3$ | H | $CH_3$ | Do. |
| 11 | $-CH_2-$ | $K_7$ | H | Cl | H | H | H | H | $CH_3$ | Do. |
| 12 | $-CH_2-$ | $K_7$ | Br | H | H | H | H | H | $CH_3$ | Do. |
| 13 | $-CH_2-$ | $K_7$ | H | $NO_2$ | H | H | H | H | $CH_3$ | Yellow. brown. |
| 14 | $-CH_2-$ | $K_7$ | $NO_2$ | H | H | H | H | $CH_3$ | $CH_3$ | Yellow. |
| 15 | $-CH_2-$ | $K_7$ | H | $CF_3$ | H | H | H | $CH_3$ | $CH_3$ | Do. |
| 16 | $-CH_2-$ | $K_{13}$ | $CH_3$ | H | $CH_3$ | H | H | H | $CH_3$ | Do. |
| 17 | $-CH_2-$ | $K_{13}$ | $CH_3$ | H | $OCH_3$ | H | H | $CH_3$ | $CH_3$ | Do. |
| 18 | $-CH_2-$ | $K_{15}$ | $CH_3$ | H | $OCH_3$ | H | H | H | $CH_3$ | Do. |
| 19 | $-CH_2-$ | $K_1$ | $CH_3$ | H | $CH_3O$ | H | H | H | $CH_3$ | Do. |
| 20 | $-CH_2-$ | $K_2$ | $CH_3$ | H | $CH_3O$ | H | H | H | $CH_3$ | Do. |
| 21 | $-CH_2-$ | $K_3$ | $CH_3$ | H | $CH_3O$ | H | H | H | $CH_3$ | Do. |
| 22 | $-CH_2-$ | $K_4$ | $CH_3$ | H | $CH_3O$ | H | H | H | $CH_3$ | Do. |
| 23 | $-CH_2-$ | $K_5$ | $CH_3$ | H | $CH_3O$ | H | H | H | $CH_3$ | Do. |
| 24 | $-CH_2-$ | $K_6$ | $CH_3$ | H | $CH_3O$ | H | H | H | $CH_3$ | Do. |
| 25 | $-CH_2-$ | $K_8$ | $CH_3$ | H | $CH_3O$ | H | H | H | $CH_3$ | Do. |

Table I—Continued

| Ex. No. | W | K$^\oplus$ | X$_1$ | X$_2$ | X$_3$ | X$_4$ | X$_5$ | X$_6$ | X$_7$ | Shade of dyeing on polyacrylonitril fibre |
|---|---|---|---|---|---|---|---|---|---|---|
| 26 | —CH$_2$— | K$_9$ | CH$_3$ | H | CH$_3$O | H | H | H | CH$_3$ | Do. |
| 27 | —CH$_2$— | K$_{10}$ | CH$_3$ | H | CH$_3$O | H | H | H | CH$_3$ | Do. |
| 28 | —CH$_2$— | K$_{14}$ | CH$_3$ | H | CH$_3$O | H | H | H | CH$_3$ | Do. |
| 29 | —CH$_2$— | K$_{16}$ | CH$_3$ | H | CH$_3$O | H | H | H | CH$_3$ | Do. |
| 30 | —CH$_2$— | K$_{17}$ | CH$_3$ | H | CH$_3$O | H | H | H | CH$_3$ | Do. |
| 31 | —CH$_2$— | K$_{19}$ | CH$_3$ | H | CH$_3$O | H | H | H | CH$_3$ | Do. |
| 32 | —CH$_2$— | K$_{20}$ | CH$_3$ | H | CH$_3$O | H | H | H | CH$_3$ | Do. |
| 33 | —CH$_2$— | K$_{21}$ | CH$_3$ | H | CH$_3$O | H | H | H | CH$_3$ | Do. |
| 34 | —CH$_2$— | K$_1$ | CH$_3$O | H | CH$_3$O | H | H | H | CH$_3$ | Do. |
| 35 | —CH$_2$— | K$_{14}$ | CH$_3$O | H | CH$_3$O | H | H | H | CH$_3$ | Do. |
| 36 | —CH$_2$— | K$_7$ | CH$_3$O | H | CH$_3$O | H | H | H | CH$_3$ | Do. |
| 37 | —CH$_2$— | K$_{16}$ | CH$_3$O | H | CH$_3$O | H | H | H | CH$_3$ | Do. |
| 38 | —CH$_2$— | K$_1$ | CH$_3$ | H | CH$_3$ | H | H | H | CH$_3$ | Do. |
| 39 | —CH$_2$— | K$_6$ | CH$_3$ | H | CH$_3$ | H | H | H | CH$_3$ | Do. |
| 40 | —CH$_2$— | K$_{15}$ | CH$_3$ | H | CH$_3$ | H | H | H | CH$_3$ | Do. |
| 41 | —CH$_2$— | K$_{19}$ | CH$_3$ | H | CH$_3$ | H | H | H | CH$_3$ | Do. |
| 42 | —CH$_2$— | K$_1$ | H | CH$_3$ | H | H | H | H | CH$_3$ | Do. |
| 43 | —CH$_2$— | K$_2$ | H | CH$_3$ | H | H | H | H | CH$_3$ | Do. |
| 44 | —CH$_2$— | K$_4$ | H | CH$_3$ | H | H | H | H | CH$_3$ | Do. |
| 45 | —CH$_2$— | K$_5$ | H | CH$_3$ | H | H | H | H | CH$_3$ | Do. |
| 46 | —CH$_2$— | K$_6$ | H | CH$_3$ | H | H | H | H | CH$_3$ | Do. |
| 47 | —CH$_2$— | K$_7$ | H | CH$_3$ | H | H | H | H | CH$_3$ | Do. |
| 48 | —CH$_2$— | K$_8$ | H | CH$_3$ | H | H | H | H | CH$_3$ | Do. |
| 49 | —CH$_2$— | K$_9$ | H | CH$_3$ | H | H | H | H | CH$_3$ | Do. |
| 50 | —CH$_2$— | K$_{16}$ | H | CH$_3$ | H | H | H | H | CH$_3$ | Do. |
| 51 | —CH$_2$— | K$_{17}$ | H | CH$_3$ | H | H | H | H | CH$_3$ | Do. |
| 52 | —CH$_2$— | K$_{19}$ | H | CH$_3$ | H | H | H | H | CH$_3$ | Do. |
| 53 | —CH$_2$— | K$_1$ | Cl | H | H | H | H | H | CH$_3$ | Do. |
| 54 | —CH$_2$— | K$_2$ | Cl | H | H | H | H | H | CH$_3$ | Do. |
| 55 | —CH$_2$— | K$_3$ | Cl | H | H | H | H | H | CH$_3$ | Do. |
| 56 | —CH$_2$— | K$_4$ | Cl | H | H | H | H | H | CH$_3$ | Do. |
| 57 | —CH$_2$— | K$_5$ | Cl | H | H | H | H | H | CH$_3$ | Do. |
| 58 | —CH$_2$— | K$_6$ | Cl | H | H | H | H | H | CH$_3$ | Do. |
| 59 | —CH$_2$— | K$_8$ | Cl | H | H | H | H | H | CH$_3$ | Do. |
| 60 | —CH$_2$— | K$_9$ | Cl | H | H | H | H | H | CH$_3$ | Do. |
| 61 | —CH$_2$— | K$_{10}$ | Cl | H | H | H | H | H | CH$_3$ | Do. |
| 62 | —CH$_2$— | K$_{13}$ | Cl | H | H | H | H | H | CH$_3$ | Do. |
| 63 | —CH$_2$— | K$_{17}$ | Cl | H | H | H | H | H | CH$_3$ | Do. |
| 64 | —CH$_2$— | K$_{19}$ | Cl | H | H | H | H | H | CH$_3$ | Do. |
| 65 | —CH$_2$— | K$_{20}$ | Cl | H | H | H | H | H | CH$_3$ | Do. |
| 66 | —CH$_2$— | K$_{21}$ | Cl | H | H | H | H | H | CH$_3$ | Do. |
| 67 | —CH$_2$— | K$_2$ | Cl | H | CH$_3$ | H | H | H | CH$_3$ | Do. |
| 68 | —CH$_2$— | K$_7$ | Cl | H | CH$_3$ | H | H | H | CH$_3$ | Do. |
| 69 | —CH$_2$— | K$_8$ | Cl | H | CH$_3$ | H | H | H | CH$_3$ | Do. |
| 70 | —CH$_2$— | K$_{15}$ | Cl | H | CH$_3$ | H | H | H | CH$_3$ | Do. |
| 71 | —CH$_2$— | K$_{17}$ | Cl | H | CH$_3$ | H | H | H | CH$_3$ | Do. |
| 72 | —CH$_2$— | K$_{19}$ | Cl | H | CH$_3$ | H | H | H | CH$_3$ | Do. |
| 73 | —CH$_2$— | K$_1$ | Cl | H | H | H | H | H | Cl | Do. |
| 74 | —CH$_2$— | K$_7$ | Cl | H | H | H | H | H | Cl | Do. |
| 75 | —CH$_2$— | K$_{16}$ | Cl | H | H | H | H | H | Cl | Do. |
| 76 | —CH$_2$— | K$_1$ | H | CH$_3$ | H | H | H | H | CH$_3$ | Do. |
| 77 | —CH$_2$— | K$_7$ | H | CH$_3$ | H | H | H | H | CH$_3$ | Do. |
| 78 | —CH$_2$— | K$_{16}$ | H | CH$_3$ | H | H | H | H | CH$_3$ | Do. |
| 79 | —CH$_2$— | K$_1$ | Cl | H | CH$_3$ | H | H | H | CH$_3$ | Do. |
| 80 | —CH$_2$— | K$_7$ | Cl | H | CH$_3$ | H | H | H | CH$_3$ | Do. |
| 81 | —CH$_2$— | K$_{16}$ | Cl | H | CH$_3$ | H | H | H | CH$_3$ | Do. |
| 82 | —CH$_2$— | K$_1$ | H | CH$_3$O | H | H | H | H | CH$_3$ | Do. |
| 83 | —CH$_2$— | K$_7$ | H | CH$_3$O | H | H | H | H | CH$_3$ | Do. |
| 84 | —CH$_2$— | K$_{16}$ | H | CH$_3$O | H | H | H | CH$_3$ | CH$_3$ | Do. |
| 85 | —CH$_2$— | K$_1$ | H | CH$_3$O | H | H | H | CH$_3$ | CH$_3$ | Do. |
| 86 | —CH$_2$— | K$_7$ | H | CH$_3$O | H | H | H | CH$_3$ | CH$_3$ | Do. |
| 87 | —CH$_2$— | K$_{16}$ | H | CH$_3$O | H | H | H | CH$_3$ | CH$_3$ | Do. |
| 88 | —CH$_2$— | K$_1$ | H | CH$_3$ | H | H | CH$_3$ | H | CH$_3$ | Do. |
| 89 | —CH$_2$— | K$_7$ | H | CH$_3$ | H | H | CH$_3$ | H | CH$_3$ | Do. |
| 90 | —CH$_2$— | K$_{16}$ | H | CH$_3$ | H | H | CH$_3$ | H | CH$_3$ | Do. |
| 91 | —CH$_2$— | K$_1$ | CF$_3$ | H | H | H | H | H | CH$_3$ | Do. |
| 92 | —CH$_2$— | K$_7$ | CF$_3$ | H | H | H | H | H | CH$_3$ | Do. |
| 93 | —CH$_2$— | K$_{16}$ | CF$_3$ | H | H | H | H | H | CH$_3$ | Do. |
| 94 | —CH$_2$— | K$_1$ | H | CF$_3$ | H | H | H | H | CH$_3$ | Do. |
| 95 | —CH$_2$— | K$_7$ | H | CF$_3$ | H | H | H | H | CH$_3$ | Do. |
| 96 | —CH$_2$— | K$_{16}$ | H | CF$_3$ | H | H | H | H | CH$_3$ | Do. |
| 97 | —CH$_2$— | K$_1$ | CH$_3$O | H | CH$_3$ | H | H | H | CH$_3$ | Do. |
| 98 | —CH$_2$— | K$_7$ | CH$_3$O | H | CH$_3$ | H | H | H | CH$_3$ | Do. |
| 99 | —CH$_2$— | K$_{16}$ | CH$_3$O | H | CH$_3$ | H | H | H | CH$_3$ | Do. |
| 100 | —CH$_2$— | K$_1$ | C$_2$H$_5$O | H | C$_2$H$_5$O | H | H | H | CH$_3$ | Do. |
| 101 | —CH$_2$— | K$_1$ | CN | H | H | H | H | H | CH$_3$ | Do. |
| 102 | —CH$_2$— | K$_7$ | CN | H | H | H | H | H | CH$_3$ | Do. |
| 103 | —CH$_2$— | K$_{16}$ | CN | H | H | H | H | H | Cl | Do. |
| 104 | —CH$_2$— | K$_{19}$ | CN | H | H | H | H | H | CN | Do. |
| 105 | —CH$_2$— | K$_1$ | CN | H | H | H | H | H | CH$_3$O | Do. |
| 106 | —CH$_2$— | K$_7$ | CN | H | H | H | H | H | C$_2$H$_5$O | Do. |
| 107 | —CH$_2$— | K$_{16}$ | CN | H | H | H | H | CH$_3$O | CH$_3$O | Do. |
| 108 | —CH$_2$— | K$_{11}$ | H | NO$_2$ | H | H | H | H | CH$_3$ | Do. |
| 109 | —CH$_2$— | K$_2$ | H | NO$_2$ | H | H | H | H | CH$_3$ | Do. |
| 110 | —CH$_2$— | K$_{16}$ | H | NO$_2$ | H | H | H | H | CH$_3$ | Do. |
| 111 | —CH$_2$— | K$_{19}$ | H | NO$_2$ | H | H | H | H | CH$_3$ | Do. |
| 112 | —CH$_2$— | K$_1$ | NO$_2$ | H | H | H | H | CH$_3$ | CH$_3$ | Reddish yellow. |
| 113 | —CH$_2$— | K$_2$ | NO$_2$ | H | H | H | H | CH$_3$ | CH$_3$ | Yellow. |
| 114 | —CH$_2$— | K$_{16}$ | NO$_2$ | H | H | H | H | CH$_3$ | CH$_3$ | Do. |
| 115 | —CH$_2$— | K$_{19}$ | NO$_2$ | H | H | H | H | CH$_3$ | CH$_3$ | Do. |
| 116 | —CH$_2$— | K$_1$ | CH$_3$ | H | CH$_3$O | H | H | H | —SO$_2$N(CH$_3$)$_2$ | Do. |
| 117 | —CH$_2$— | K$_7$ | CH$_3$ | H | CH$_3$O | H | H | H | —SO$_2$N(CH$_3$)$_2$ | Do. |
| 118 | —CH$_2$— | K$_{16}$ | CH$_3$ | H | CH$_3$O | H | H | H | —SO$_2$N(CH$_3$)$_2$ | Do. |
| 119 | —CH$_2$— | K$_1$ | CH$_3$ | H | CH$_3$O | H | H | H | SO$_2$—CH$_3$ | Do. |
| 120 | —CH$_2$— | K$_7$ | CH$_3$ | H | CH$_3$O | H | H | H | SO$_2$—CH$_3$ | Do. |
| 121 | —CH$_2$— | K$_8$ | CH$_3$ | H | CH$_3$O | H | H | H | SO$_2$—CH$_3$ | Do. |
| 122 | —CH$_2$— | K$_{15}$ | CH$_3$ | H | CH$_3$O | H | H | H | SO$_2$—CH$_3$ | Do. |
| 123 | —CH$_2$— | K$_{16}$ | CH$_3$ | H | CH$_3$O | H | H | H | SO$_2$—CH$_3$ | Do. |
| 124 | —CH$_2$— | K$_{19}$ | CH$_3$ | H | CH$_3$O | H | H | H | SO$_2$—CH$_3$ | Do. |
| 125 | —CH$_2$— | K$_1$ | Br | H | H | H | H | H | CH$_3$ | Do. |
| 126 | —CH$_2$— | K$_7$ | Br | H | H | H | H | H | CN | Do. |

3,674,772

Table I—Continued

| Ex. No. | W | K⊕ | X₁ | X₂ | X₃ | X₄ | X₅ | X₆ | X₇ | Shade of dyeing on polyacrylonitril fibre |
|---|---|---|---|---|---|---|---|---|---|---|
| 127 | —CH₂— | K₈ | Br | H | H | H | H | H | Cl | Do. |
| 128 | —CH₂— | K₁₅ | Br | H | H | H | H | H | Cl | Do. |
| 129 | —CH₂— | K₁₆ | Br | H | H | H | H | H | Cl | Do. |
| 130 | —CH₂— | K₁₉ | Br | H | H | H | H | H | Cl | Do. |
| 131 | —CH₂— | K₁ | CH₃ | H | CH₃ | H | H | H | CH₂—N\|C=\|CH₂—O | Do. |
| 132 | —CH₂— | K₇ | CH₃ | H | CH₃ | H | H | H | Same as above | Do. |
| 133 | —CH₂— | K₈ | CH₃ | H | CH₃ | H | H | H | ......do...... | Do. |
| 134 | —CH₂— | K₁₅ | CH₃ | H | CH₃ | H | H | H | ......do...... | Do. |
| 135 | —CH₂— | K₁₆ | CH₃ | H | CH₃ | H | H | H | ......do...... | Do. |
| 136 | —CH₂— | K₁₉ | H | H | CH₃ | H | H | H | ......do...... | Do. |
| 137 | —CH₂— | K₁ | H | Cl | H | H | H | H | CH₂—C=O\|N—\|CH₂—CH₂ | Do. |
| 138 | —CH₂— | K₇ | H | Cl | H | CH₃ | H | H | Same as above | Do. |
| 139 | —CH₂— | K₁₅ | H | Cl | H | CH₃ | H | H | ......do...... | Do. |
| 140 | —CH₂— | K₁₉ | H | Cl | H | CH₃ | H | H | ......do...... | Do. |
| 141 | —CH₂— | K₁ | CH₃ | H | CH₃O | H | H | H | O—C=O\|CH₂ N—\|CH₂—CH₂ | Do. |
| 142 | —CH₂— | K₇ | CH₃ | H | CH₃O | H | H | H | Same as above | Do. |
| 143 | —CH₂— | K₈ | CH₃ | H | CH₃O | H | H | H | ......do...... | Do. |
| 144 | —CH₂— | K₁₅ | CH₃ | H | CH₃O | H | H | H | ......do...... | Do. |
| 145 | —CH₂— | K₁₆ | CH₃ | H | CH₃O | H | H | H | ......do...... | Do. |
| 146 | —CH₂— | K₁₉ | CH₃ | H | CH₃O | H | H | H | ......do...... | Do. |
| 147 | —CH₂— | K₁ | CH₃ | H | CH₃ | H | H | H | O—C=O\|CH₂ N—\|CH₂—CH₂ | Do. |
| 148 | —CH₂— | K₇ | CH₃ | H | CH₃ | H | H | H | Same as above | Do. |
| 149 | —CH₂— | K₁₆ | CH₃ | H | CH₃ | H | H | H | ......do...... | Do. |
| 150 | —CH₂— | K₁ | Cl | H | Cl | H | H | H | CH₃CONH— | Do. |
| 151 | —CH₂— | K₇ | Cl | H | Cl | H | H | H | CH₃CONH— | Do. |
| 152 | —CH₂— | K₁₆ | Cl | H | Cl | H | H | H | CH₃CONH— | Do. |
| 153 | —CH₂— | K₁ | CH₃ | H | Cl | H | H | H | ⬡—CO—NH— | Do. |
| 154 | —CH₂— | K₇ | CH₃ | H | Cl | H | H | H | Same as above | Do. |
| 155 | —CH₂— | K₈ | CH₃ | H | Cl | H | H | H | ......do...... | Do. |
| 156 | —CH₂— | K₁₉ | CH₃ | H | Cl | H | H | H | ......do...... | Do. |
| 157 | —CH₂— | K₁ | Cl | H | CH₃O | H | H | H | H₅C₂OOC—NH— | Do. |
| 158 | —CH₂— | K₇ | Cl | H | CH₃O | H | H | H | H₅C₂OOC—NH— | Do. |
| 159 | —CH₂— | K₁₆ | Cl | H | CH₃O | H | H | H | H₅C₂OOC—NH— | Do. |
| 160 | —CH₂— | K₁ | CH₃SO₂ | H | H | H | H | H | CH₃ | Do. |
| 161 | —CH₂— | K₇ | CH₃SO₂ | H | H | H | H | H | CH₃ | Do. |
| 162 | —CH₂— | K₈ | CH₃SO₂ | H | H | H | H | H | CH₃ | Do. |
| 163 | —CH₂— | K₁₅ | CH₃SO₂ | H | H | H | H | H | CH₃ | Do. |
| 164 | —CH₂— | K₁₆ | CH₃SO₂ | H | H | H | H | H | CH₃ | Do. |
| 165 | —CH₂— | K₁₉ | CH₃SO₂ | H | H | H | H | H | CH₃ | Do. |
| 166 | —CH₂— | K₁ | H | CH₃SO₂— | H | H | H | H | CH₃ | Do. |
| 167 | —CH₂— | K₇ | H | CH₃SO₂— | H | H | H | H | CH₃ | Do. |
| 168 | —CH₂— | K₁₆ | H | CH₃SO₂— | H | H | H | H | CH₃ | Do. |
| 169 | —CH₂— | K₁ | (CH₃)₂N—SO₂— | H | H | H | H | H | CH₃ | Do. |
| 170 | —CH₂— | K₇ | (CH₃)₂N—SO₂— | H | H | H | H | H | CH₃ | Do. |
| 171 | —CH₂— | K₈ | (CH₃)₂N—SO₂— | H | H | H | H | H | CH₃ | Do. |
| 172 | —CH₂— | K₁₅ | (CH₃)₂N—SO₂— | H | H | H | H | H | CH₃ | Do. |
| 173 | —CH₂— | K₁₆ | (CH₃)₂N—SO₂— | H | H | H | H | H | CH₃ | Do. |
| 174 | —CH₂— | K₁₉ | (CH₃)₂N—SO₂— | H | H | H | H | H | CH₃ | Do. |
| 175 | —CH₂— | K₁ | H | (CH₃)₂N—SO₂— | H | H | H | H | CH₃ | Do. |
| 176 | —CH₂— | K₇ | H | (CH₃)₂N—SO₂— | H | H | H | H | CH₃ | Do. |
| 177 | —CH₂— | K₁₆ | H | (CH₃)₂N—SO₂— | H | H | H | H | CH₃ | Do. |
| 178 | —CH₂— | K₁ | Cl | H | CH₃ | H | H | CH₃ | CH₃ | Do. |
| 179 | —CH₂— | K₇ | Cl | H | CH₃ | H | H | CH₃ | CH₃ | Do. |
| 180 | —CH₂— | K₁₆ | Cl | H | CH₃ | H | H | H | CH₃ | Do. |
| 181 | —CH₂— | K₂₂ | CH₃ | H | CH₃O | H | H | H | CH₃ | Do. |
| 182 | —CH₂— | K₂₃ | CH₃ | H | H | H | H | H | CH₃ | Do. |
| 182a | C₃H₆— | K₁ | C₂H₅ | H | H | H | H | H | CH₃ | Do. |
| 182b | CH₃\|—CH— | K₁ | OC₃H₇ | H | H | H | H | H | CH₃ | Do. |
| 182c | CH₃\|—CH— | K₁ | H | C₄H₉—SO₂— | H | H | H | H | CH₃ | Do. |
| 182d | C₂H₅\|—CH— | K₁ | H | ⬡—SO₂— | H | H | H | H | CH₃ | Do. |
| 182e | —C₂H₄— | K₁ | H | H | Br | H | H | H | Br | Do. |
| 182f | —C₂H₄— | K₁ | CH₃ | H | OCH₃ | H | H | H | CH₃ | Do. |
| 182g | —C₂H₄— | K₁ | CH₃ | H | OCH₃ | H | H | H | C₂H₅ | Do. |
| 182h | —C₂H₄— | K₁ | CH₃ | H | OCH₃ | H | H | H | CH₃ | Do. |
| 182i | —C₂H₄— | K₂ | CH₃ | H | OCH₃ | H | H | H | CH₃ | Do. |
| 182k | —C₂H₄— | K₃ | CH₃ | H | OCH₃ | H | H | H | CH₃ | Do. |
| 182l | —C₂H₄— | K₁₇ | CH₃ | H | OCH₃ | H | H | H | CH₃ | Do. |
| 182m | —C₃H₆— | K₁ | Cl | H | H | H | H | H | CH₃ | Do. |

The symbols K⊕, X₁–X₇ and Y₁ in the formula

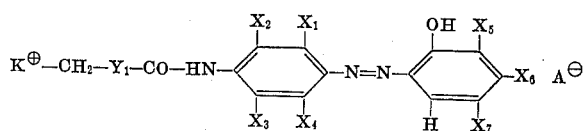

have the meanings assigned to them in Table 2. The anion A⊖ may be any one of those named in the specification. The symbol K⊕ may stand for any of the radicals K⊕ listed in Table A.

Formulas of representative dyes of the foregoing Examples are as follows:

Example 5

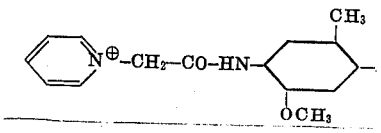

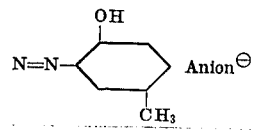

TABLE 2

| Example number | K+ | Y₁ | X₁ | X₂ | X₃ | X₄ | X₅ | X₆ | X₇ | Shade of dyeing on polyacrylonitril fibre |
|---|---|---|---|---|---|---|---|---|---|---|
| 183 | K₁ | ⌬ | Cl | H | H | H | H | H | CH₃ | Yellow. |
| 184 | K₁₆ | Same as above | Cl | H | H | H | H | H | CH₃ | Do. |
| 185 | K₁ | do | Cl | CH₃O | H | H | H | H | CH₃ | Do. |
| 186 | K₁₆ | do | H | CH₃O | H | H | H | H | CH₃ | Do. |
| 187 | K₁ | do | —CH₃ | CH₃O | H | H | H | H | CH₃ | Do. |
| 188 | K₁₅ | do | —CH₃ | CH₃O | CH₃O | H | H | H | CH₃ | Do. |
| 189 | K₁ | do | —CH₃ | CH₃O | CH₃ | H | H | H | CH₃ | Do. |
| 190 | K₁₆ | do | —CH₃ | CH₃O | CH₃ | H | H | H | CH₃ | Do. |
| 191 | K₁ | do | Cl | CH₃O | CH₃ | H | H | H | CH₃ | Do. |
| 192 | K₁₆ | do | Cl | CH₃O | CH₃ | H | H | H | CH₃ | Do. |
| 193 | K₁ | do | Cl | CH₃O | —OCH₃ | H | H | H | CH₃ | Do. |
| 194 | K₁₆ | do | Cl | CH₃O | —OCH₃ | H | H | H | CH₃ | Do. |
| 195 | K₁ | do | —CH₃ | CH₃O | —OCH₃ | H | H | H | CH₃ | Do. |
| 196 | K₁₆ | do | —CH₃ | CH₃O | —OCH₃ | H | H | H | CH₃ | Do. |
| 197 | K₁ | do | —CH₃ | —CH₃ | —OCH₃ | H | H | H | CH₃ | Do. |
| 198 | K₁₆ | do | —CH₃ | —CH₃ | —OCH₃ | H | H | H | CH₃ | Do. |
| 199 | K₁ | ⌬ | H | H | H | H | H | H | CH₃ | Do. |
| 200 | K₁₆ | ⌬ | H | H | H | H | H | H | CH₃ | Do. |
| 201 | K₁ | CH₃—⌬ | H | H | H | H | H | H | CH₃ | Do. |
| 202 | K₁₆ | Same as above | H | H | H | H | H | H | CH₃ | Do. |
| 203 | K₁ | do | H | CH₃O | H | H | H | H | CH₃ | Do. |
| 204 | K₁₆ | do | H | CH₃O | H | H | H | H | CH₃ | Do. |
| 205 | K₁ | do | —CH₃ | CH₃O | CH₃O | H | H | H | CH₃ | Do. |
| 206 | K₁₆ | do | —CH₃ | CH₃O | CH₃O | H | H | H | CH₃ | Do. |

EXAMPLE 207

22.85 Parts of 4-amino-2-methoxy-1-(2′-chloropropionyl)-amino-benzene, prepared by reducing 1-(2′-chloropropionyl)-amino-2-methoxy-4-nitrobenzene by the normal method, are diazotized with 6.9 parts of sodium nitrite in dilute hydrochloric acid at 0°. An ice cold suspension of 13 parts of 1-hydroxy-4-methylbenzene is added to the diazo solution and the pH is adjusted to 8.0 with sodium carbonate. On completion of the coupling reaction the resulting compound is filtered off. 17.4 Parts of this compound are entered into 3.6 parts of dimethylhydrazine and 100 parts of dimethyl formamide at 20° and the solution is stirred at 50° until the reaction is complete. It is run into dilute, ice cold hydrochloric acid to precipitate the reaction product as a chloride, and this is filtered off, dried and if necessary purfied by recrystallization, e.g. from acetic acid. The new dye is obtained as a yellow powder which dyes polyacrylonitrile fibers in greenish yellow shades having good light and wet fastness.

Similarly good dyes are obtained when the 17.4 parts of 4-(2″-chloropropionylamino)-2′-hydroxy-3-methoxy-5′-methyl-1,1′-azobenzene in this Example are replaced either by 17.4 parts of 4-(1‴-chloropropionylamino)-2′-hydroxy-3-methoxy-5′-methyl-1,1′-azobenzene or by 18.1 parts of 4-(3″-chlorobutyrylamino)-2′-hydroxy-4-methoxy-5′-methyl-1,1′-azobenzene and the procedure of this Example is followed.

Example 19

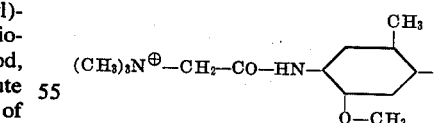

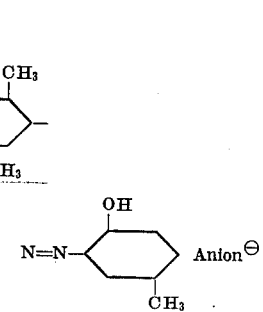

Example 29

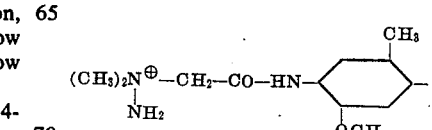

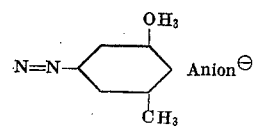

Example 187

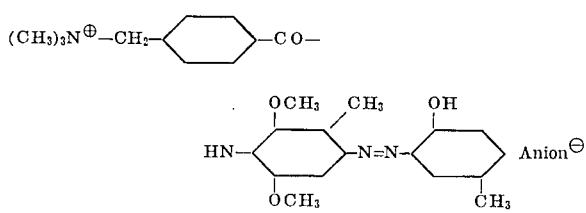

Example 188

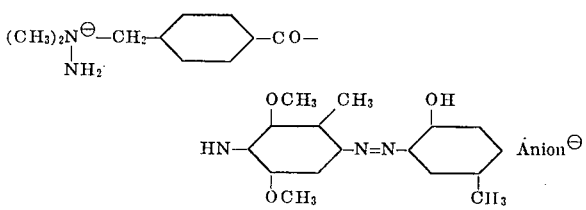

Having thus disclosed the invention what we claim is:
1. Basic dye of the formula

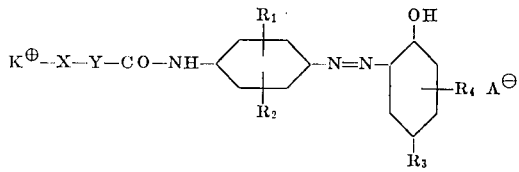

wherein
X is lower alkylene or hydroxy(lower)alkylene;
Y is a direct linkage, arylene or methyl-substituted arylene, arylene being a member selected from the group consisting of phenylene, naphthylene and tetrahydronaphthylene;
$R_1$ is a member selected from the group consisting of alkyl, substituted alkyl, alkoxy, substituted alkoxy, chloro, bromo, nitro, cyano, alkylsulphonyl, phenylsulphonyl, trifluoromethyl and sulphonic acid amide; and, when Y is arylene or methyl-substituted arylene, a member selected from the group consisting of hydrogen, alkyl, substituted alkyl, alkoxy, substituted alkoxy, chloro, bromo, nitro, cyano, alkylsulphonyl, phenylsulphonyl, trifluoromethyl and sulphonic acid amide;
$R_2$ is a member selected from the group consisting of hydrogen, alkyl, substituted alkyl, alkoxy, substituted alkoxy, chloro and bromo;
$R_3$ is a member selected from the group consisting of hydrogen, chloro, bromo, alkyl, substituted alkyl, alkoxy, substituted alkoxy, cyano, alkylsulphonyl, phenylsulphonyl, acetylamino, benzoylamino, ethoxycarbonylamino and dialkylsulphonic acid amide;
$R_4$ is a member selected from the group consisting of hydrogen, chloro, bromo, alkyl and substituted alkyl;
$A^\ominus$ is an anion;
$K^\oplus$ is a group of one of the formulas

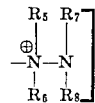

and

$R_5$ is a member selected from the group consisting of alkyl, substituted alkyl, cyclohexyl and substituted cyclohexyl;
$R_6$ is a member selected from the group consisting of alkyl, substituted alkyl, cyclohexyl and substituted cyclohexyl;
each of $R_7$ and $R_8$ is, independently, a member selected from the group consisting of hydrogen, alkyl, substituted alkyl, cyclohexyl and substituted cyclohexyl;
each of $R_9$, $R_{10}$ and $R_{11}$ is, independently, a member selected from the group consisting of alkyl, substituted alkyl, cyclohexyl and substituted cyclohexyl;
each alkyl being lower alkyl; each alkoxy being lower alkoxy; and any substituent of substituted alkyl, substituted cyclohexyl or substituted alkoxy being a member selected from the group consisting of hydroxy, chloro, bromo, cyano and phenyl.

2. Basic dye according to claim 1 wherein Y is a direct linkage, and $R_1$ is a member selected from the group consisting of alkyl, substituted alkyl, alkoxy, substituted alkoxy, chloro, bromo, nitro, cyano, alkylsulphonyl, phenylsulphonyl, trifluoromethyl and sulphonic acid amide.

3. Basic dye according to claim 1 wherein Y is arylene or methyl-substituted arylene, and $R_1$ is a member selected from the group consisting of hydrogen, alkyl, substituted alkyl, alkoxy, substituted alkoxy, chloro, bromo, nitro, cyano, alkylsulphonyl, phenylsulphonyl, trifluoromethyl and sulphonic acid amide.

4. Basic dye according to claim 1 wherein $K^\oplus$ is

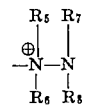

5. Basic dye according to claim 1 of the formula

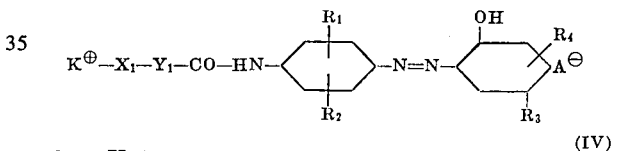

(IV)

where $X_1$ is

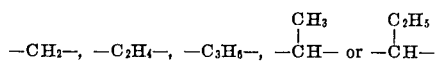

$Y_1$ represents the direct linkage, and $R_1$ to $R_4$, $A^\ominus$ and $K^\oplus$ have the meanings assigned to them in claim 1.

6. Basic dye according to claim 1 of the formula

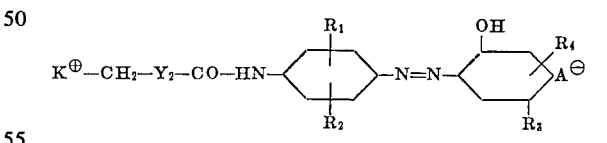

(V)

where $Y_2$ is arylene or methyl-substituted arylene and $R_1$ to $R_4$, $A^\ominus$ and $K^\oplus$ have the meanings given them in claim 1.

7. Basic dye according to claim 1 of the formula

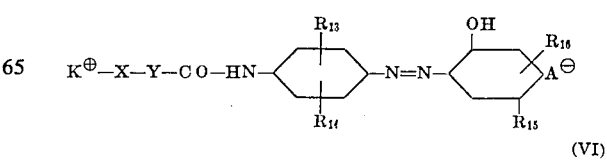

(VI)

where $R_{13}$ is methyl, ethyl, methoxy, ethoxy, trifluoromethyl, nitro, chlorine or bromine;
$R_{14}$ is hydrogen, methyl, ethyl, methoxy or ethoxy;
$R_{15}$ is hydrogen, chloro, bromo or alkyl or alkoxy having one to six carbon atoms;
and $R_{16}$ is hydrogen.

8. Basic dye according to claim 1 of the formula
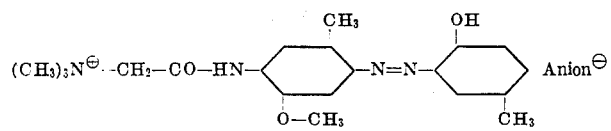
9. Basic dye according to claim 1 of the formula
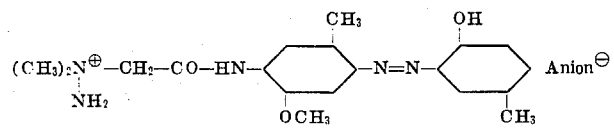
10. Basic dye according to claim 1 of the formula
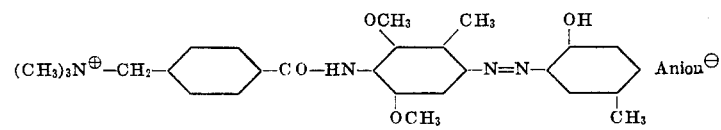
11. Basic dye according to claim 1 of the formula
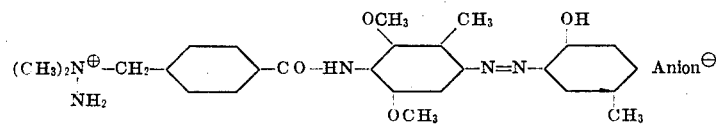
* * * * *